United States Patent Office 3,174,224
Patented Mar. 23, 1965

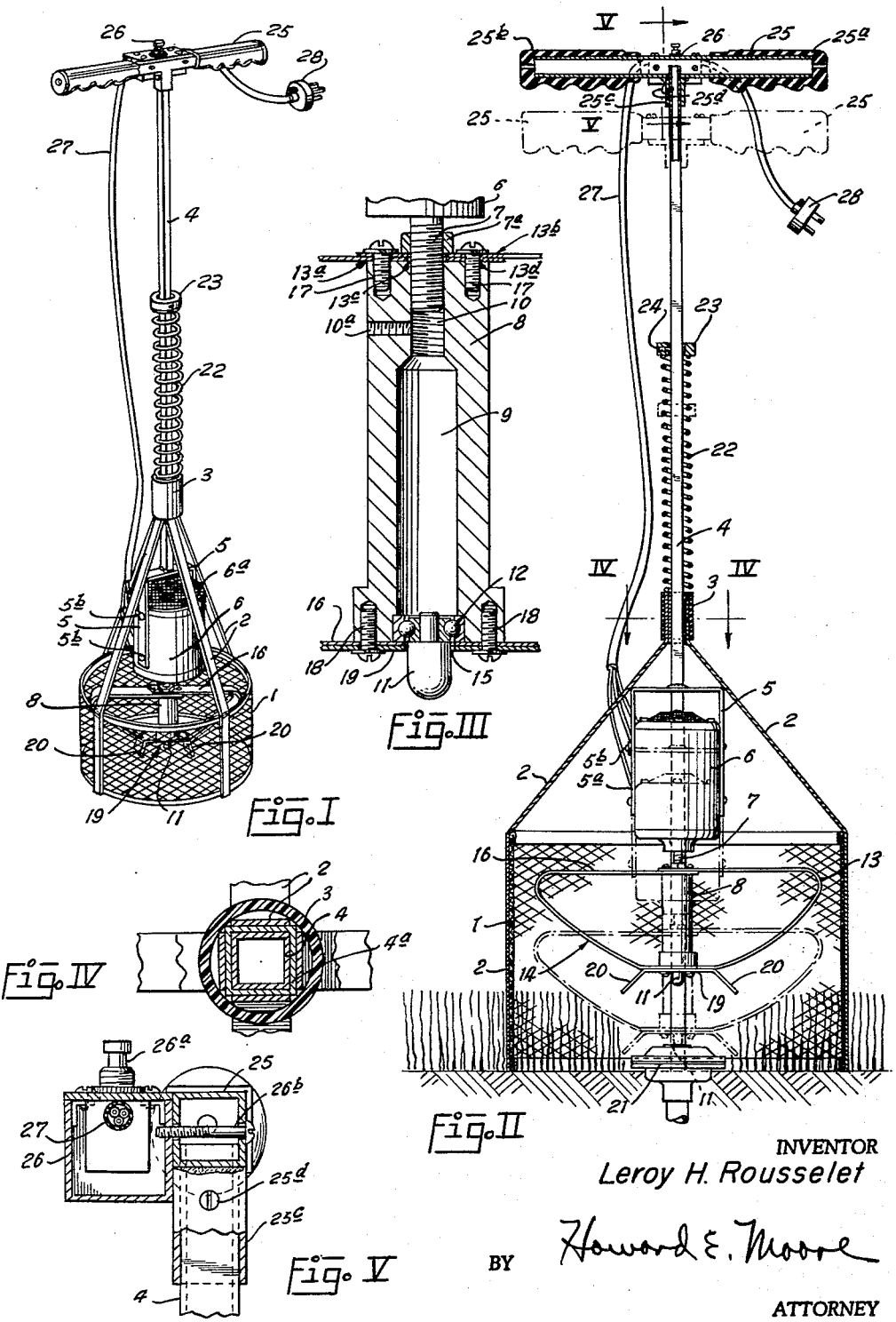

3,174,224
GRASS TRIMMER
Leroy H. Rousselet, 7247 Westbrook Lane, Dallas, Tex.
Filed Oct. 4, 1963, Ser. No. 313,954
4 Claims. (Cl. 30—264)

This invention has to do with a grass trimmer, and is particularly concerned with a grass trimmer for cutting and trimming grass around automatic sprinkler heads used in watering lawns.

Underground sprinkler systems customarily have perforated heads connected with the underground pipes which extend above the surface of the ground through which water is dispensed and distributed.

Such heads are obstructed by grass and are often damaged by running lawn mowers thereover, requiring expensive repairs.

The present invention is intended to provide a grass cutter for cutting grass over and adjacent to the sprinkler heads so that dispensing of water therefrom is unobstructed and it will not be necessary to run the ordinary lawn mower thereover.

The device incorporating the present invention provides a grass cutter for trimming grass about sprinkler heads which is a unitary unit, incorporating a motor, a blade, with means for positioning the blade over the sprinkler head in such a manner that the sprinkler head is protected from the blade, with means for lowering the blade over the sprinkler head to cut a conical area out of the grass thereabout, and for automatically raising the blade after use.

It is, therefore, a primary object of the invention to provide a trimmer device for trimming about sprinkler heads incorporating means for centering and spacing the blade over the sprinkler head in position to cut a conical area out of the grass surrounding the sprinkler head.

Another object of the invention is to provide spring means in such a device for raising the blade away from the sprinkler head after being used.

Still another object of the invention is to provide a self-contained trimmer unit of the type indicated having an electric motor mounted in conjunction with the blade immediately adjacent thereto with a handle for lowering the blade and motor, and spring means to return them to raised position after being lowered.

Another object of the invention is to provide a circular guard in conjunction with the motor and blade assembly hereinbefore indicated, which prevents foreign objects from being propelled outwardly by the blade.

A further object of the invention is to provide a special blade assembly including a continuous strap of blade material curved arcuately downwardly and joined at the upper surface by a horizontal portion, in conjunction with a spacer member between the upper and lower portions of the blade, the blade being so constructed that when rotated at high speed, foreign objects such as rocks, metal cuttings, etc., are prevented from being propelled upwardly through the upper end of the guard.

A further object of the invention is to provide a blade assembly as hereinbefore indicated, with an auxiliary blade secured to the lower surface thereof, having downwardly turned end portions for trimming about the outer periphery of the sprinkler head.

Other and further objects of the invention will become apparent upon reading the detailed specification hereinafter following, and by referring to the drawing annexed hereto.

A suitable embodiment of the invention is shown in the attached drawing in which:

FIGURE I is a side perspective view of the trimmer device;

FIGURE II is an elevational view partially sectionalized showing the guard and blade in relationship to a sprinkler head and showing the blade in broken lines in lowered position over the sprinkler head;

FIGURE III is a cross-sectional, elevational view of the blade spacer member with the rotatable idler ball mounted in the lower end thereof, and showing the motor shaft threadedly engaged therewith;

FIGURE IV is a transverse, cross-sectional view taken along the line IV—IV of FIGURE II; and FIGURE V is a sectional view taken along the line V—V of FIGURE II.

Numeral references are employed to indicate the various parts shown in the drawing, and like numerals indicate like parts throughout the various figures of the drawing.

The device includes a circular guard 1 which is made of foraminous material, such as heavy mesh screen or expanded metal, which prevents rocks and other foreign matter from being propelled laterally by the blade hereinafter described.

The circular guard is mounted upon, and supported by, the brace members 2, which are curved inwardly and upwardly and are secured at their upper ends to a rectangular sleeve 4a, which slidably receives the rectangular shaft 4. The surrounding sleeve 3 is preferably made of resilient material, such as rubber or plastic, which may be pressed downwardly with a press-fit over the ends of the braces 2.

A motor support bracket 5 has legs 5a which embrace the electric motor 6 and are secured thereto by rivets 5b. The motor bracket 5 is secured to the lower end of the rectangular shaft 4 so that it is movable therewith. The upward movement of the motor bracket 5 is limited by engagement with the inwardly extending portions of the braces 2. The motor 6 includes a rotatable shaft 7 which, as shown, is threadedly engaged in the threaded bore 10 of the spacer member 8. A screen 6a is provided over the upper end of motor 6 to keep out grass cuttings and dirt. The spacer member 8 includes a threaded bore 10 and a counter bore 9.

A lateral threaded bore 10a is provided through the wall of the spacer 8 communicating with the bore 10 in order to receive a set screw if desired, so that a motor shaft not having threads thereon, can be engaged in the bore 10, as well as one having threads thereon. A nut 7a is threaded about shaft 7 against blade ends 13a and 13b.

A rotatable spacer and idler head 11 is mounted in the lower end of the counter bore 9 on a suitable bearing 12.

The blade 13 is comprised of a continuous piece of strap steel material which has an arcuate lower portion 14 extending about the lower end of the spacer 8, and has a passage 15 therethrough to receive the idler head 11.

The upper ends of the blade 13 are overlapped, as indicated at 13a and 13b above the upper end of the spacer 8, and have coinciding holes 13c therein to receive the motor shaft 7. Coinciding holes 13d are also provided in the ends 13a and 13b of the blade through which the screws 17 extend and are threaded into threaded bores provided in the upper surface of the spacer member 8, to thereby retain the ends of the blade members in overlapped relationship and secure same to the spacer member 8.

The lower portion 14 of the blade 13 is secured to the lower face of the spacer member 8 by means of screws 18, which extend through coinciding passages provided through the auxiliary blade 19 and the blade 13, and are threaded into interiorly threaded bores in the lower face of the spacer member 8, in order to secure the blade 13 in place.

The auxiliary blade 19 is comprised of a flat piece of blade material which is turned downwardly and angularly outwardly at each end, to provide downwardly directed blade portions as indicated at 20. Blade member 19 is secured to the lower face of the blade 13 and spacer 8 by means of the screws 18.

A helical spring 22 is provided about the shaft 4, the lower end thereof being abutted against the sleeve 3 and the upper end thereof being secured to the spring stop 23, which is secured to the shaft 4 by means of a set screw 24.

A handle 25 is provided on the upper end of the shaft 4 which includes rubber grippers 25a and 25b, and is attached to the shaft by a hollow rectangular extension 25c slipped over the upper end of the shaft and held in place by a screw 25d.

A switch box 26 is secured to the handle 25 by means of screws 26b, and a push button switch 26a is arranged to control the flow of electrical current through the power cable 27, which extends through the switch box 26.

The power cable 27 carries electrical leads to the motor 6 and has a plug 28 on the outer end thereof for plugging into a suitable electric power receptacle.

The operation and function of the device hereinbefore described is as follows:

The circular guard 1 is placed over the sprinkler head 21 so that it encircles same in the manner shown in FIGURE II. The handle 25 is grasped and downward pressure is exerted thereon, which lowers the shaft 4 and the motor 6, and the blade 13, carried thereby, as the spring 22 is contracted. The idler ball 11 engages the upper surface of the sprinkler head 21 to provide a standoff of the blade with relation to the sprinkler head to protect same. The idler ball 11 should be substantially centered with relation to the upper surface of the sprinkler head 21. The switch 26 is then energized, thereby starting the motor 6 and rotating the blade 13. As the blade 13 rotates, a conical area is cut out of the grass surrounding the sprinkler head, and if the auxiliary blade 19 is employed therewith, the downwardly turned portions 20 will extend downwardly about the sprinkler head, to trim grass from around the edges of the sprinkler head. The blade rotates about the idler ball 11.

The blade 13 is so constructed that it is supported at its upper and lower surfaces and the outer edges thereof are supported by the transverse horizontal portion 16 so that when the blade is rotated at high speed, there is no tendency for the outwardly extending portions of the blade to distort downwardly as was the case in previous blade constructions, which were not so supported.

Furthermore, the horizontally extending portion 16 forming the upper portion of the blade member 13, when rotated at high speed, deflects rocks, metal cuttings and other foreign materials downwardly to prevent them from being thrown outwardly through the upper end of the guard to strike the operator of the device.

The spacer member 8 is so constructed, that it will accommodate either a threaded or an unthreaded motor shaft, and provides a rigid support between the upper and lower portions of the blade member 13.

The auxiliary blade member 20 may be dispensed with if desired, but normally it would be used with the blade member 13 to trim about the edges of the sprinkler head.

After the grass has been trimmed over the sprinkler head, pressure may be released from the handle 25, and the motor and blade will be raised to upward position, as shown in full lines in FIG. II, by the relaxation of the spring 22. The upward travel of the motor and blade assembly is limited by the guard 5 striking the inwardly turned portions of the braces 2.

It will be seen that I have provided a trimmer device of the type described which provides for cutting a conical area about a sprinkler head, which protects the sprinkler head while the trimmer blade is being rotated, which cuts the grass about the outer edges of the sprinkler head, which employs a blade firmly supported against outward distortion, and which prevents foreign material from being thrown upwardly and outwardly therefrom, and wherein the motor and blade assembly are mounted in conjunction with each other within the guard assembly, and are automatically raised when pressure is released from the handle and from the shaft on which they are mounted.

It will be understood that other and further forms of the invention may be devised without departing from the spirit and scope of the appended claims.

Having described my invention, I claim:

1. In a device of the class described,
   a shaft;
   a hollow guard
     having support means slidably attached to the shaft;
   a motor mount attached to the lower end of the shaft;
   an electric motor attached to the mount;
   a rotatable drive shaft extending from the lower end of the motor;
   a vertically extending spacer member attached to the drive shaft;
   a cutter blade
     having a horizontal upper portion attached to the upper end of the spacer member,
     and a spaced lower portion attached to the lower end of the spacer,
       said lower portion extending upwardly and outwardly and being joined to the ends of the upper portion to provide a continuous cutter blade having an upper horizontal portion and a lower upwardly and outwardly diverging portion joined and supported in spaced relationship substantially centrally thereof;
   an idler member rotatably mounted in the lower end of the spacer and extending below the blade;
   and spring means attached between the support means and the shaft
     arranged to urge the shaft upwardly with relation to the support.

2. In a device of the class described,
   a shaft;
   a hollow guard having support means thereon slidably mounted on the shaft;
   a vertically extending spacer member suspended to the lower end of the shaft;
   a cutter blade having
     a horizontal upper portion attached to the upper end of the spacer member,
     and a spaced lower portion attached to the lower end of the spacer member,
     said lower portion extending upwardly and outwardly and being joined to the ends of the upper portion to provide a continuous blade member having an upper horizontal portion and a lower upwardly and outwardly diverging portion joined and supported in spaced relationship substantially centrally thereof;
   spring means attached between the shaft and the upper end of the support means to urge the shaft upwardly with relation thereto;
   a rotatable idler head attached to the spacer member and extending below the cutter blade to space the blade from a sprinkler head;
   and power means to rotate the cutter blade.

3. The combination called for in claim 2 wherein the power means for rotating the cutter blade is an electric motor mounted between the lower end of the shaft and the spacer member.

4. In a device of the class described,
   a shaft;
   a hollow guard having support means slidably attached to the shaft;

a motor mount attached to the lower end of the shaft;
an electric motor attached to the mount;
a rotatable drive shaft extending from the lower end of the motor;
a vertically extending spacer member attached to the drive shaft;
a cutter blade having
 a horizontal upper portion attached to the upper end of the spacer member, and a spaced lower portion attached to the lower end of the spacer, said lower portion extending upwardly and outwardly and being joined to the ends of the upper portion;
an idler member rotatably mounted in the lower end of the spacer and extending below the lower portion of the blade;
spring means attached between the support means and the shaft arranged to urge the shaft upwardly with relation to the support;
and spaced blade portions extending downwardly from the lower portion of the blade member.

References Cited by the Examiner

UNITED STATES PATENTS

| | | | |
|---|---|---|---|
| 1,545,835 | 7/25 | Komow et al. | 30—310 X |
| 2,319,947 | 5/43 | Oswood. | |
| 2,583,113 | 1/52 | Mogel | 30—287 X |
| 2,953,852 | 9/60 | Dehn | 30—265 X |
| 3,057,064 | 10/62 | Bertolino | 30—276 |
| 3,077,664 | 2/63 | Murawski | 30—276 |
| 3,083,593 | 4/63 | Cotter. | |

WILLIAM FELDMAN, *Primary Examiner.*

MILTON S. MEHR, *Examiner.*